Patented Sept. 21, 1943

2,329,717

UNITED STATES PATENT OFFICE 2,329,717

PRODUCTION OF CELLULOSE ESTERS

Clifford I. Haney and Mervin E. Martin, Cumberland, Md., assignors to Celanese Corporation of America, a corporation of Delaware No Drawing. Application July 10, 1942,
Serial No. 450,406

12 Claims. (Cl. 260—230)

This invention relates to the production of organic esters of cellulose and relates more particularly to the production of cellulose acetate, and other lower fatty acid esters of cellulose, of improved properties.

An object of our invention is the production of organic acid esters of cellulose of improved stability so that the use of stabilization treatments may be substantially reduced or entirely eliminated.

Another object of our invention is the production of organic acid esters of cellulose which are particularly suitable for use in molding operations.

Other objects of our invention will appear from the following detailed description.

In the process of preparing organic esters of cellulose, the esterification of cellulose is usually carried out by treating cellulose with an organic acid anhydride in the presence of a catalyst, such as sulfuric acid and an organic acid diluent, or solvent, for the ester of cellulose being formed. The esterified cellulose is obtained in the form of a viscous, homogeneous solution in the organic acid diluent, to which water is added in amounts sufficient to convert any organic acid anhydride remaining into the corresponding acid. The cellulose ester, usually after the addition of a further quantity of water, is permitted to hydrolyze or ripen to develop the desired solubility characteristics. Water and/or other non-solvent for the cellulose ester is then added in sufficient amounts to precipitate the cellulose ester from solution. The cellulose ester is finally washed and/or treated with water to free it of acids as much as is possible.

In the preparation of cellulose acetate in accordance with the above process, the cellulose with or without a pretreatment with organic acids, or organic acids containing some sulfuric acid, is usually acetylated by treatment with acetic anhydride and a catalyst, such as sulfuric acid, in the presence of glacial acetic acid as solvent for the cellulose acetate formed. The sulfuric acid catalyst is normally present in amounts of from 9 to 15%, or even 20%, on the weight of the cellulose. Part of this sulfuric acid may be introduced in the pretreatment which is designed to make the cellulose more reactive. When the acetylation is completed, water is stirred into the reaction mixture to convert the excess acetic anhydride to acetic acid, and, after the addition of a further amount of water, the resulting solution of cellulose acetate in acetic acid, containing the sulfuric acid employed as catalyst, is permitted to stand until the desired solubility characteristics are reached. During this standing or ripening period, not only are acetyl groups split off, but in addition, combined sulfuric acid is split off. When the desired solubility characteristics are reached, further ripening is halted and the mixture is treated with a large excess of water or other non-solvent to precipitate the cellulose acetate. The precipitated cellulose acetate is washed with water to remove as much acid or other non-cellulose ester materials as possible and is then subjected to a stabilizing treatment, usually by heating it in suspension in very dilute sulfuric acid, with the object of still further reducing its content of combined sulfuric acid. The latter impairs the stability of the cellulose acetate and imparts thereto a tendency to decompose, degrade and/or discolor. The degree of stability is measured by the degree of acidity developed when a sample of cellulose acetate is treated with distilled water under conditions of elevated temperature and pressure for a predetermined period of time. The development of excessive acidity denotes a product of unsatisfactory stability.

During the preparation of cellulose acetate by the above method, the acetylation may take from 1½ to 7 hours and the ripening from 20 to 45 or 50 hours, while the stabilizing treatment may take from 3 to 6 hours to achieve the desired stability in the product. Not only is productive capacity limited by the necessity for a stabilizing treatment but the latter consumes substantial amounts of sulfuric acid and adds to the cost of production.

Moreover, while the cellulose acetate produced as described may be sufficiently stable after the stabilization treatment so that it may be employed satisfactorily for the production of yarn and other textile materials, the cellulose acetate so produced often fails to possess sufficient stability when subjected to molding operations. The molded cellulose acetate suffers considerable degradation on being molded, as indicated by a substantial loss in viscosity.

We have now discovered that cellulose acetate, as well as other organic derivatives of cellulose, of excellent stability characteristics may be prepared without requiring any stabilization treatment. This desirable result may be achieved if, after an acetylation reaction, as described, a part of the sulfuric acid present in the acetylation mixture is neutralized, and the remainder of the sulfuric acid is then neutralized with a suitable metallic salt so that a mineral acid, other than that employed as catalyst, is formed. The cellulose acetate is allowed to ripen to the desired solubility characteristics in the resulting solution containing the mineral acid formed therein. When the desired solubility characteristics are reached, the cellulose acetate may be precipitated from solution in any suitable manner, washed and dried.

When neutralizing the sulfuric acid present, from 5 to 95% of the acid may be neutralized before the metallic salt is added. Preferably, we neutralize about 50% of said acid. The neutralizing agent employed for the partial neutralization should, of course, be one which does not yield a mineral acid. Examples of suitable neutralizing agents are salts of magnesium and calcium, such as magnesium acetate, calcium acetate, magnesium carbonate, or calcium carbonate. Zinc acetate or zinc oxide may also be employed as the neutralizing agent, or mixture of any two or more of the foregoing compounds may be used. The neutralizing agent preferably employed in accordance with this invention comprises a mixture of magnesium acetate and calcium acetate.

Examples of metallic salts yielding a mineral acid on reaction with the acid catalyst are magnesium chloride, zinc chloride, calcium phosphate, magnesium pyrophosphate, magnesium orthophosphate, magnesium nitrate and calcium nitrate. The metallic salt may be added in an amount just sufficient to neutralize the sulfuric acid present, or it may be added somewhat in excess.

After the metallic salt has been added, the ripening may be carried out for 5 to 50 hours at a temperature of from 30 to 100° C. Water for ripening may be added in an amount of from 15 to 100% or even 200% on the weight of the original cellulose acetylated.

Prior to acetylation the cellulose may, for example, be pretreated with acetic acid or formic acid, or a mixture of these acids to render the cellulose more reactive. The acids may be present in a small amount, say, for example, 1 to 50% on the weight of the cellulose, or in much larger quantities, for example, on the order of 100%, 200% or even 300% on the weight of the cellulose, and may contain a small quantity of sulphuric acid, for instance, ½ to 1 or 2% on the weight of the cellulose. The pretreatment is preferably allowed to go on for some hours, for example, overnight, though much shorter periods produce the desired results when sulfuric acid is present. The pretreated cellulose is then treated with acetic anhydride and sulfuric acid in appropriate amount to bring about acetylation.

The celluloisc materials esterified in accordance with our process may be any suitable form of cellulose or cellulose derivative. It may be cotton, cotton, linters, woodpulp, regenerated cellulose, or other cellulosic material obtainable from various other sources such as grasses, straws, hulls and the like.

In order further to illustrate our invention, but without being limited thereto, the following examples are given:

*Example I*

170 parts by weight of cotton are acetylated with 358 parts of acetic anhydride, 1080 parts of acetic acid and 18 parts of sulfuric acid. The time of acetylation is 4 hours during which time the mixture is allowed to attain a peak temperature of 35° C. After acetylation is completed water in an amount sufficient only to react with any excess acetic anhydride is added to the reaction mixture.

There is then added to the acetylation mixture sufficient neutralizing agent to neutralize 50% of the sulfuric acid. Water for ripening in an amount equal to 20% on the weight of the original cotton is added with the neutralizing agent. The neutralizing agent employed comprises a mixture of magnesium acetate and calcium acetate obtained by reacting calcined dolomite in dilute acetic acid to form said acetates, the resulting clear, aqueous solution being employed as the neutralizing agent. Magnesium chloride, together with some acetic acid to aid in solution, is added in an amount just sufficient to neutralize the remaining sulfuric acid. With the magnesium chloride is added another 20% of water on the weight of the cellulose. The resulting solution is ripened for 48 hours at a temperature of 35° C. The ripened cellulose acetate is precipitated from solution by the addition of a large amount of water and is washed and dried.

The cellulose acetate formed by this ripening process is of very high stability as measured by the acidity developed when a sample is treated with distilled water under conditions of elevated temperature and pressure. The cellulose acetate is likewise very stable on being molded, as indicated by the fact that it suffers only a slight viscosity loss on being molded.

*Example II*

Cotton is acetylated in the manner described in Example I and 50% of the sulfuric acid present in the acetylation mixture is neutralized as described. Magnesium chloride, together with some acetic acid to aid solution, is added in an amount equal to twice that necessary for neutralizing the sulfuric acid present. The resulting solution is ripened at a temperature of 35° C. for 48 hours and then precipitated, washed and dried.

The cellulose acetate is of excellent stability as measured by the acidity developed when treated at elevated temperature and pressure in distilled water. This cellulose acetate exhibits an unusually high molding stability, suffering only a very small loss in viscosity on being molded.

While our invention is particularly described in connection with the preparation of cellulose acetate, other cellulose esters may also be prepared, for example, the cellulose esters of propionic, butyric or similar acids, or mixed esters, for example, cellulose acetate-propionate or cellulose acetate-butyrate.

It is to be understood that the foregoing detailed description is given merely by way of illustration and that many variations may be made therein without departing from the spirit of our invention.

Having described our invention, what we desire to secure by Letters Patent is:

1. Process for the preparation of organic esters of cellulose of increased stability, which comprises esterifying cellulose by means of a lower fatty acid anhydride in the presence of sulfuric acid as catalyst, adding neutralizing agent, selected from the group consisting of magnesium, calcium and zinc compounds which do not yield mineral acids, in an amount sufficient to neutralize a portion of the sulfuric acid present, neutralizing the remainder of the sulfuric acid with a metallic salt yielding a mineral acid other than sulfuric acid, adding water to the esterification mixture in a plurality of stages, and permitting the lower fatty acid ester of cellulose produced to ripen.

2. Process for the preparation of cellulose acetate of increased stability, which comprises acetylating cellulose by means of acetic acid anhydride in the presence of sulfuric acid as catalyst, adding neutralizing agent, selected from the group consisting of magnesium, calcium and zinc compounds which do not yield mineral acids, in an amount sufficient to neutralize a portion of the sulfuric acid present, and neutralizing the remainder of the sulfuric acid with a metallic salt yielding a mineral acid other than sulfuric acid, adding water to the acetylation mixture in a plurality of stages, and permitting the cellulose acetate produced to ripen.

3. Process for the preparation of cellulose acetate of increased stability, which comprises acetylating cellulose by means of acetic acid anhydride in the presence of sulfuric acid as catalyst, adding neutralizing agent, selected from the group consisting of magnesium, calcium and zinc compounds which do not yield mineral acids, in an amount sufficient to neutralize from 5 to 95% of the sulfuric acid present, and neutralizing the remainder of the sulfuric acid with a metallic salt yielding a mineral acid other than sulfuric acid, adding water to the acetylation mixture in a plurality of stages, and permitting the cellulose acetate produced to ripen.

4. Process for the preparation of cellulose acetate of increased stability, which comprises acetylating cellulose by means of acetic acid anhydride in the presence of sulfuric acid as catalyst, adding neutralizing agent, selected from the group consisting of magnesium, calcium and zinc compounds which do not yield mineral acids, in an amount sufficient to neutralize 50% of the sulfuric acid present, and neutralizing the remainder of the sulfuric acid with a metallic salt yielding a mineral acid other than sulfuric acid, adding water to the acetylation mixture in a plurality of stages, and permitting the cellulose acetate produced to ripen.

5. Process for the preparation of cellulose acetate of increased stability, which comprises acetylating cellulose by means of acetic acid anhydride in the presence of sulfuric acid as catalyst, adding neutralizing agent, selected from the group consisting of magnesium, calcium and zinc compounds which do not yield mineral acids, in an amount sufficient to neutralize from 5 to 95% of the sulfuric acid present, and neutralizing the remainder of the sulfuric acid with a metallic salt yielding a mineral acid other than sulfuric acid, adding water to the acetylation mixture in a plurality of stages, and permitting the cellulose acetate produced to ripen at a temperature of from 30 to 100° C.

6. Process for the preparation of cellulose acetate of increased stability, which comprises acetylating cellulose by means of acetic acid anhydride in the presence of sulfuric acid as catalyst, adding neutralizing agent, selected from the group consisting of magnesium, calcium and zinc compounds which do not yield mineral acids, in an amount sufficient to neutralize from 5 to 95% of the sulfuric acid present, and neutralizing the remainder of the sulfuric acid with a metallic salt yielding a mineral acid other than sulfuric acid, adding water to the acetylation mixture in a plurality of stages in an amount equal to from 15 to 200% on the weight of the cellulose originally present, and permitting the cellulose acetate produced to ripen at a temperature of from 30 to 100° C.

7. Process for the preparation of cellulose acetate of increased stability, which comprises acetylating cellulose by means of acetic acid anhydride in the present of sulfuric acid as catalyst, adding neutralizing agent, selected from the group consisting of magnesium, calcium and zinc compounds which do not yield mineral acids, in an amount sufficient to neutralize 50% of the sulfuric acid present, and neutralizing the remainder of the sulfuric acid with a metallic salt yielding a mineral acid other than sulfuric acid, adding water to the acetylation mixture in a plurality of stages in an amount equal to from 15 to 200% on the weight of the cellulose originally present, and permitting the cellulose acetate produced to ripen at a temperature of from 30 to 100° C.

8. Process for the preparation of cellulose acetate of increased stability, which comprises acetylating cellulose by means of acetic acid anhydride in the presence of sulfuric acid as catalyst, adding neutralizing agent, comprising a mixture of calcium aceate and magnesium acetate, in an amount sufficient to neutralize 50% of the sulfuric acid present, and neutralizing the remainder of the sulfuric acid with a metallic salt yielding a mineral acid other than sulfuric acid, adding water to the acetylation mixture in a plurality of stages, and permitting the cellulose aceate produced to ripen.

9. Process for the preparation of cellulose acetate of increased stability, which comprises acetylating cellulose by means of acetic acid anhydride in the presence of sulfuric acid as catalyst, adding neutralizing agent, comprising a mixture of calcium acetate and magnesium acetate, in an amount sufficient to neutralize from 5 to 95% of the sulfuric acid present, and neutralizing the remainder of the sulfuric acid with a metallic salt yielding a mineral acid other than sulfuric acid, adding water to the acetylation mixture in a plurality of stages, and permitting the cellulose acetate produced to ripen at a temperature of from 30 to 100° C.

10. Process for the preparation of cellulose acetate of increased stability, which comprises acetylating cellulose by means of acetic acid anhydride in the presence of sulfuric acid as catalyst, adding neutralizing agent, comprising a mixture of calcium acetate and magnesium acetate, in an amount sufficient to neutralize from 5 to 95% of the sulfuric acid present, and neutralizing the remainder of the sulfuric acid with a metallic salt yielding a mineral acid other than sulfuric acid, adding water to the acetylation mixture in a plurality of stages in an amount equal to from 15 to 200% on the weight of the cellulose originally present, and permitting the cellulose acetate produced to ripen at a temperature of from 30 to 100° C.

11. Process for the preparation of cellulose acetate of increased stability, which comprises acetylating cellulose by means of acetic acid anhydride in the presence of sulfuric acid as catalyst, adding neutralizing agent, comprising a mixture of calcium acetate and magnesium acetate, in an amount sufficient to neutralize 50% of the sulfuric acid present, and neutralizing the remainder of the sulfuric acid with a metallic salt yielding a mineral acid other than sulfuric acid, adding water to the acetylation mixture in a plurality of stages in an amount equal to from 15 to 200% on the weight of the cellulose originally present, and permitting the cellulose acetate produced to ripen at a temperature of from 30 to 100° C.

12. Process for the preparation of cellulose acetate of increased stability, which comprises acetylating cellulose by means of acetic acid anhydride in the presence of sulfuric acid as catalyst, adding neutralizing agent, comprising a mixture of cellulose acetate and magnesium acetate, in an amount sufficient to neutralize 50% of the sulfuric acid present, adding water to the acetylation mixture in a plurality of stages in an amount equal to 40% on the weight of the cellulose originally present, and permitting the cellulose aceate produced to ripen at 35° C. for 48 hours.

CLIFFORD I. HANEY.
MERVIN E. MARTIN.